Aug. 22, 1933.   H. C. RENTSCHLER   1,923,845
PHOTO-ELECTRIC DEVICE
Filed Jan. 14, 1931
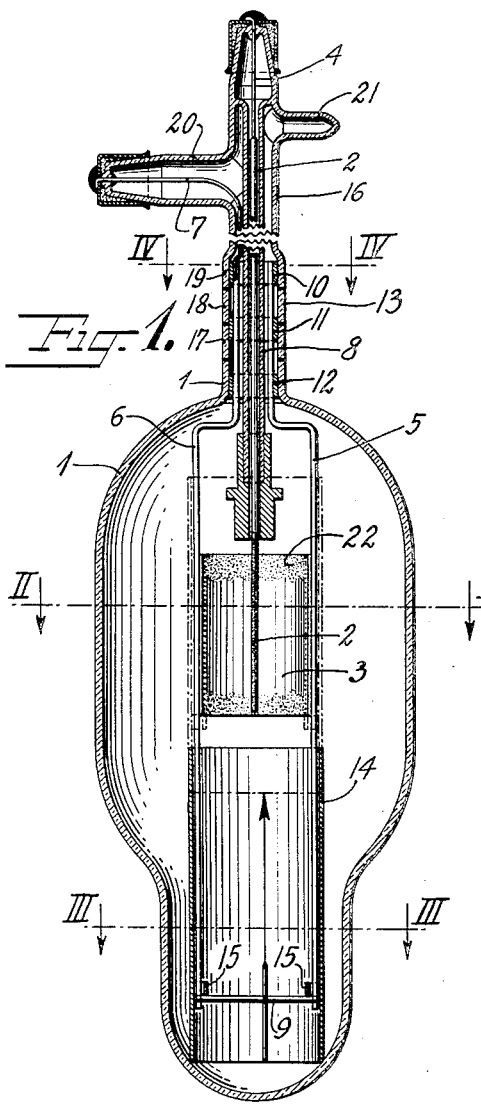
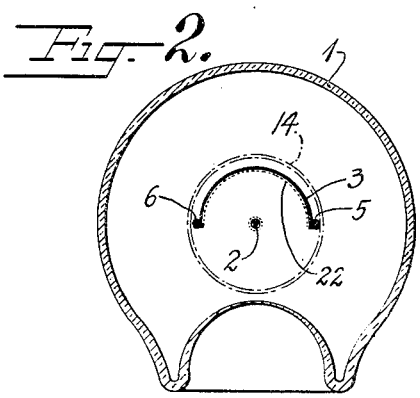
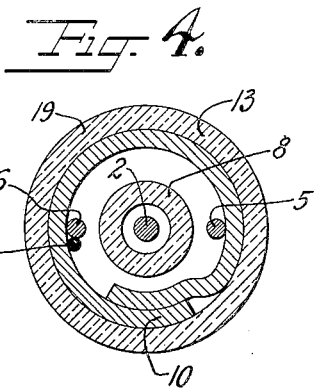
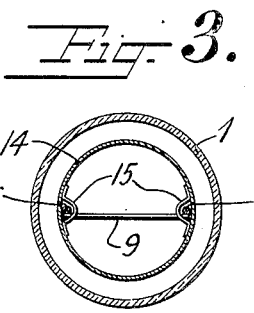
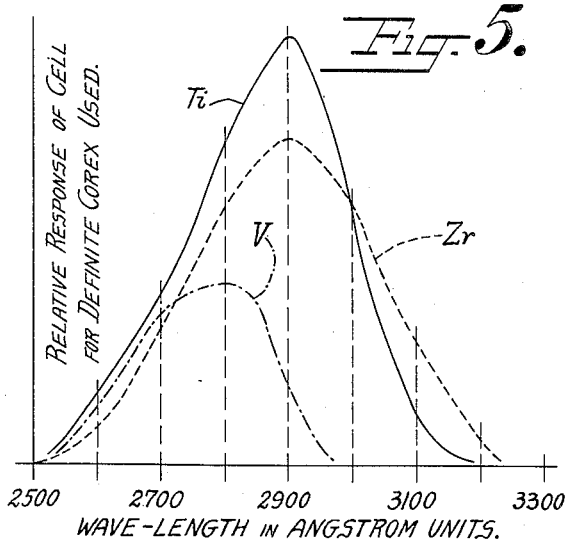
INVENTOR
H. C. RENTSCHLER
BY
ATTORNEY Patented Aug. 22, 1933

1,923,845

UNITED STATES PATENT OFFICE 1,923,845

PHOTO-ELECTRIC DEVICE

Harvey Clayton Rentschler, East Orange, N. J., assignor to Westinghouse Lamp Company, a Corporation of Pennsylvania Application January 14, 1931. Serial No. 508,569

8 Claims. (Cl. 250—27.5)

This invention relates to a photo electric tube and more particularly to a tube which is sensitive only in the ultra violet region of the spectrum.

In a copending application Serial No. 360,667 filed May 6, 1929, I have described and claimed a photo electric tube in which the sensitivity starts in the blue region of the spectrum and extends into the ultra violet region.

In copending applications Serial No. 360,666 filed May 6, 1929 and Serial No. 370,223 filed June 12, 1929 I have disclosed photo electric tubes sensitive to restricted portions of ultra violet radiation. The latter application on July 20, 1931 matured into Patent No. 1,815,073. Such devices are useful in the measuring of preferred or of restricted bands of radiation, and particularly useful in the measurement of radiation lying in the so-called erythema range of radiation having wave lengths approximating 2900 angstrom units.

An object of the present invention is to produce a photo electric tube which is substantially non-sensitive to radiation lying in the entire visible spectrum but which is sensitive only to such radiation of wave lengths less than about 3000 angstrom units.

Another object is to produce a photo electric tube which is sensitive to ultra violet radiation having wave lengths below about 3000 angstrom units.

Another object of the present invention is to provide a cathode for a photo electric device which is sensitive solely to radiation of wave lengths less than about 3000 angstrom units.

A further object is to provide an improved method of producing a photo sensitive electrode.

Other objects and advantages will appear as the description of the invention proceeds.

Heretofore in the production of photo electric tubes for measuring radiation in the ultra violet region, cadmium or zinc has been generally used as the photo sensitive cathode but the photo electric current obtained from cadmium is extremely feeble, requiring for its detection a sensitive electroscope or electrometer or special vacuum tube amplifying means.

In accordance with my invention I have produced a photo electric tube which is sensitive only to ultra violet radiation of wave lengths less than about 3000 angstrom units, in which device the photo electric response is strong.

I have discovered that the metal vanadium exhibits a "normal" photo electric effect toward radiation of wave lengths less than about 3000 angstrom units but is substantially non-sensitive to light within the visible region.

When the cathode of a photo electric tube is comprised of vanadium the envelope must be comprised at least in part of a material, such as quartz, which is permeable to radiation of such low wave lengths. If desired the envelope may be composed of a glass which is transparent only to radiation lying in one particular band or range of radiation of wave lengths less than about 3000 angstrom units. Thus for instance for erythema treatment, the range of useful rays is restricted to a narrow band each side of about 2900 angstrom units and therefore, in the production of a dosimeter employing a photo electric tube for determining the length of treatment from a given source of ultra violet light, it is necessary that the tube be sensitive to light principally in this region.

It is necessary, therefore, to employ a cathode which is sensitive to such radiation and an enclosing envelope which is permeable at least in part thereto. Preferably the cathode should be sensitive solely to such radiation, or at least substantially non-responsive to radiation of wave lengths substantially higher than this preferred erythema range. The nearer the response to the erythema curve, the better the tube is for the definite measurement of the desired radiation.

By employing an envelope for the tube which is opaque to rays of relatively short wave length, such as glass having a composition similar to that which is known to the trade as Corex, a photo electric device having a sensitivity at about 2900 angstrom units, and only a low order of sensitivity at wave lengths appreciably above and below this value may be obtained. The percent transmission of the envelope for various wave lengths may be varied by changing the thickness of a glass of any definite composition or by varying the composition thereof and in this manner the peak of the output curve of the photo electric device may, to a limited extent, be varied.

I have found that by employing very thin glass windows for the photo electric device of a composition that is permeable to certain radiation there is a very great increase in the current output of the tube, this is particularly true with respect to radiation of the lower wave lengths. I have found that windows of glass having the composition similar to that which is known to the trade as Pyrex, which glass ordinarily is not considered transparent to ultra violet radiation may be employed where the thickness of the window is less than about .01 inches.

The ultra violet transmission of the thin glass window is comparable with that of quartz, at the thickness ordinarily employed with quartz except to radiation in the relatively short wave length end of the spectrum.

In producing a photo electric tube, in accordance with my invention I preferably employ vanadium for both the anode and cathode although it is to be understood that the anode may be composed of another metal, such as nickel.

The cathode may consist of a solid mass of vanadium, such as a rod, wire, sheet, etc, or it may take the form of a thin deposit upon the surface of an electrical conductor or on the wall of the envelope, in contact with a leading-in conductor. When employed as a coating on the glass envelope I prefer to first coat the glass, over the portion which is to constitute the cathode, with a noble metal, such as gold, in order to obtain a better contact with the cathode leading-in wire. Preferably, however, I comprise the photo sensitive cathode of a relatively thin strip of metal such as nickel surfaced at least in part with vanadium.

In order to obtain a photo sensitive vanadium cathode it is essential to thoroughly clean the surface of all impurities, such as carbides, nitrides, hydrides, oxides, etc. which would be deleterious to such photo sensitivity. This can be most conveniently accomplished by electrically sputtering away the surface by ionic bombardment in a glow discharge in an inert gas by using cathode of vanadium which later serves as the anode of the tube and a second electrode as anode for the glow discharge. The enclosing envelope should be protected in any convenient manner from a darkening deposit of the vaporized or sputtered electrode material.

The construction of the tube and the method of producing the photo sensitive vanadium cathode surface will appear more fully in connection with a detailed description of the accompanying drawing in which Fig. 1 is a side elevational cross sectional view of a photo electric tube embodying the present invention;

Fig. 2 is a cross sectional view taken along plane II—II Fig. 1;

Fig. 3 is a cross sectional view taken along plane III—III Fig. 1;

Fig. 4 is an enlarged cross sectional view taken along plane IV—IV Fig. 1 showing the method employed in supporting the electrode structure of the photo electric device of the present invention; and Fig. 5 is a curve showing the current output of a tube plotted against the wave length of the incident ultra violet light.

Referring to Fig. 1, I have shown a photoelectric tube comprising an envelope 1 composed of a material which is transparent to radiation of wave lengths less than about 3000 angstrom units, such as quartz or special ultra violet transmitting glasses, having compositions similar to those glasses known to the trade as Corex, Vitaglass, Uviol, etc. Preferably the envelope 1 is comprised of quartz.

Within the envelope 1 is mounted a rod shaped anode 2 and a plate shaped cathode 3. Anode 2 is preferably composed of vanadium, and is mounted upon a leading in conductor 4. The cathode 3 is preferably comprised of an electrical conductor such as nickel with vanadium and is supported on two spaced rigid wires 5 and 6, the latter of which is electrically connected to lead wire 7 extending through the envelope in the manner shown. An insulating tube 8 of quartz, glass, porcelain or similar material surrounds the leading-in wire 4 and restricts the active area thereof to the end portion 2. The supports 5 and 6 may be similarly protected, if desired.

A frame-work consisting of the two parallel longitudinally extending support wires 5 and 6 and a bracing cross wire 9, is mounted within the device by means of spring collar members 10, 11 and 12 frictionally engaging the side walls of the tubular extension 13 of the envelope 1. Supported on the frame work is a cylindrical shield 14, having on its inner surface, straps or eyelets 15 through which the vertical wires 5 and 6 have sliding engagement. By inverting the tube the shield 14 may be moved from one end of the frame to the other. The function of the shield 14 is to protect the walls of the envelope from vaporized or sputtered electrode material during the formation of the photo sensitive cathode.

The envelope 1 being comprised of quartz is provided with the tubular extension 13 so as to provide means to unite the quartz envelope to the relatively hard glass of composition known to the trade as Nonex or Pyrex, comprising the end section 16 of the device. Leading in wires 4 and 7 are preferably comprised of material, such as tungsten.

In order to obtain an hermetic union between the quartz envelope 1 and end section 16 the tubular extension 13 of the envelope is comprised of graded sections of glasses 17, 18 and 19 of intermediate coefficients of expansion lying between quartz and Nonex glass. This type of sealed union between a soft glass section and a quartz section is known in the art as a graded seal. As the leading in wire terminals 4 and 6 must be separated from each other as far as possible in order to avoid inter-electrode leakage and capacity effects, the length of the side arm 20 and the distance of the arm from the terminal end of leading in wire 4 is arbitrary and dependent upon predetermined desired conditions. It is obvious that other types of graded seals may be used and that section 16 may be comprised of soft glass, if desired, and that leading-in wires 4 and 7 may be comprised of material which may be sealed therethrough.

After the electrode assembled has been sealed into the envelope, the envelope is baked out and exhausted in the usual manner through tubulature 21 and the shield 14 and cathode element 3 degasified by high frequency induction heating. A filing of a gaseous medium, such as argon, neon or helium, is then introduced into the envelope in any convenient manner as through the exhaust tubing 21. Argon gas at a pressure of from about 1 to 6 mm. is satisfactory. The tube is then inverted to position the shield 14 about the electrodes 2 and 3, and a glow discharge is created between the electrodes of sufficient current density to effect a considerable sputtering of the electrode material.

A direct current discharge is employed. The cathode 3 of the photo electric tube should serve as the anode for the glow discharge. The discharge should be continued until the surface of the cathode electrode is surfaced at least in part with the vaporized material from the electrode 2. I usually continue the discharge for about two hours. The sputtered material collects on the interior of the shield 14 or upon the surface of the electrode 3 and the envelope is maintained clear and free from light obscuring deposits. After the cathode is thus surfaced, the shield 14 is moved to the position shown in Fig. 1.

If a gas filling is desired within the tube the tube may be employed immediately following the glow discharge or after partial exhausting otherwise the gas must be pumped out completely.

In Fig. 2 is shown the plate shaped cathode 3 disposed between two support wires 5 and 6 and interiorly surfaced with vanadium coating 22. If desired the envelope 1 may be comprised of glass, such as is known to the trade as Corex, and a relatively thin window may be formed therein by heating up the glass wall of the envelope at any desired point but preferably opposite the cathode and drawing in a bulbous portion having a relatively thin dome and gradually tapering walls.

The thickness of the relatively thin dome of the window may be about .01 inches although windows of a diameter of about 1 inch and a thickness of only .0001 inches will withstand full atmospheric pressures. The thin window is very much more transparent to ultra violet light than the remainder of the envelope.

Thus, for instance, with an envelope, as shown in Fig. 2, composed of an ultra violet transmitting glass, such as Corex having a thickness of about one-thirty second of an inch and a window of a thickness of about .01 inches, the current output of the tube when subjected to the light from a mercury arc, was several times greater when the window side of the tube was directed towards light source than when the opposite side was directed thereto.

This increase in current was due to the lesser absorption of the ultra violet light of short wave lengths in the thin window, than in the glass of full wall thickness. While this particular window is not illustrated herein it is an incorporate part of the present invention and has been more fully set forth in my co-pending applications above identified.

In Fig. 3 I have shown the manner in which the shield member 14 is supported in slidable relation to the support wires 5 and 6. In Fig. 4, is illustrated one method of supporting the electrodes by means of spring collar members frictionally engaging the interior wall of the tubular extension 13 of the envelope 1.

Fig. 5 shows the relation between the wave length of the incident light and the current output of a tube employing an envelope which absorbs the ultra violet light of wave lengths less than about 2400 angstrom units, so as to render the tube sensitive only to a restricted band of frequencies in the region most desired for erythema treatment. The curves illustrated therein disclose the type of current output obtained when three types of cathodes are employed, namely, zirconium, titanium and vanadium. Each curve is identified by the proper chemical symbol of the metal comprising the cathode.

It will be noted that whereas the peak of the Ti and Zr curve approximates the 2900 angstrom units line, the peak of the vanadium cathode lies at about the 2800 angstrom units line. Moreover the response to the radiation in the vanadium tube extends over a fairly wide radiation range lying between 2700 angstrom units and nearly 2900 angstrom units. This range of sensitivity is particularly valuable in measuring the strength of the radiation.

The short wave portion of the curves in Fig. 5 designates approximately the per cent transmission of the radiation through the wall of the envelope, the long wave portion of the curves indicates the total current or photo electric sensitivity of the cathode to such radiation. The difference in the short wave portion of the three curves is due to unavoidable variations in the thicknesses of the enclosing envelope.

The form of the curves shown will vary somewhat with different glass compositions and may be modified materially by employing glass of different thicknesses so that the effect of the absorption of the ultra violet radiation in the glass, on the output of the tube may be varied. With the form of curves shown, the maximum sensitivity of the vanadium photo electric device occurs at about 2800 angstrom units which is still within the narrow region of the spectrum most suitable for erythema radiation measurement.

The peak of the curve shown may be shifted to the left by using a thinner envelope and thus decreasing the absorption of the lower wave length radiation or it may be shifted to the right to narrow up the band to which the tube is sensitive by increasing the thickness of the envelope.

In prior filed copending applications above identified, I have disclosed photo electric devices in which the cathode consists of a photo electrically sensitive deposit of metal upon a wall of the envelope. It is contemplated within the scope of the present invention that the vanadium cathode may be similarly prepared.

Preferably the envelope prior to effecting the deposit of the vanadium thereon is coated with a layer of a noble metal, such as gold, adjacent to and in electrical contact with a leading in wire extending through the envelope in order to produce a good electrical contact between the cathode and the cathode leading in wire.

This gold coating may be most conveniently applied by painting the envelope with liquid bright gold, drying the coating for a few minutes at about 150° C. During the baking, a stream of air should be maintained through the envelope to carry away the volatilized material given off from the coating.

While I have shown several embodiments of my invention it is to be understood that the invention is not limited to such specific embodiments but is susceptible of many changes and modifications and such embodiments are to be considered merely as illustrative of the invention and not in a limiting sense, except in accordance with the appended claims.

What is claimed is:

1. An electron discharge device comprising an envelope transparent in part to radiation of wave lengths less than about 3000 angstrom units, an anode and a photosensitive cathode therein, said cathode being composed of vanadium.

2. An electron discharge device comprising an envelope transparent to radiation of wave lengths less than about 3000 angstrom units, an anode and a photo sensitive cathode therein, said cathode being composed superficially of vanadium.

3. An electron discharge device comprising an envelope transparent in part to radiation of wave lengths less than about 3000 angstrom units, an anode and a photo sensitive cathode therein, said cathode comprising a photo electrically sensitive film of vanadium electrically sputtered upon an electrical conductor.

4. An electron discharge device comprising an envelope transparent in part to radiation of wave lengths less than about 3000 angstrom units, an anode and a photo sensitive cathode therein, said cathode comprising a nickel superficially coated in part with a photo sensitive layer of vanadium, said cathode being sensitive to substantially all radiations between about 2600 and 2900 angstrom units and being substantially insensitive to radiations above about 3000 angstrom units.

5. A photo electric tube comprising an envelope, an anode and a photo electrically sensitive cathode therein, said cathode being composed of vanadium, said envelope having a section thereof more transparent to radiation of wave lengths less than about 3000 angstrom units than the remainder of the envelope.

6. An electron discharge device comprising an envelope, an anode and a photo sensitive cathode therein, said cathode being sensitive to radiation having wave lengths less than about 3000 angstrom units and a thin vitreous window in said envelope transparent to said radiation, said cathode being sensitive to substantially all radiations between about 2600 and 2900 angstrom units and being substantially insensitive to radiations above about 3000 angstrom units.

7. An electron discharge device comprising an envelope having a portion transparent to radiation having a wave length below 3000 angstrom units but opaque to radiation below about 2400 angstrom units, an anode and a photo sensitive cathode therein, said cathode being composed of vanadium.

8. A photo electric tube comprising the combination of an enclosing envelope permeable to ultra violet radiation approximating 2800 angstrom units and a photo sensitive cathode comprised substantially of vanadium and an anode.

HARVEY CLAYTON RENTSCHLER.